United States Patent
Suhre et al.

(10) Patent No.: US 12,371,168 B1
(45) Date of Patent: Jul. 29, 2025

(54) SEAT BOTTOM ASSEMBLY WITH SELF TENSIONING DIAPHRAGM AND UNDER SEAT ACCESS

(71) Applicant: B/E Aerospace, Inc., Winston-Salem, NC (US)

(72) Inventors: Ryan J. Suhre, Winston-Salem, NC (US); David J. Poole, Winston-Salem, NC (US); Javier Valdes de la Garza, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/412,874

(22) Filed: Jan. 15, 2024

(51) Int. Cl.
  *B64D 11/06* (2006.01)
  *A47C 7/56* (2006.01)
(52) U.S. Cl.
  CPC ............ *B64D 11/0647* (2014.12); *A47C 7/56* (2013.01); *B64D 11/064* (2014.12)
(58) Field of Classification Search
  CPC .................................. A47C 7/56; B64D 11/064
  See application file for complete search history.

(56) References Cited

U.S. PATENT DOCUMENTS

| | | | | |
|---|---|---|---|---|
| 4,498,703 A * | 2/1985 | Schmidhuber | ..... | B64D 11/0647 248/371 |
| 4,712,834 A * | 12/1987 | Warrick | ..... | B64D 11/06 297/216.17 |
| 6,604,792 B1 * | 8/2003 | Picard | ..... | A47C 31/126 297/452.56 |
| 7,073,852 B1 | 7/2006 | Zheng | | |
| 7,607,732 B2 * | 10/2009 | Beroth | ..... | B60N 2/6054 297/229 |
| 8,696,052 B2 | 4/2014 | Zhu | | |
| 9,873,510 B2 | 1/2018 | Ferguson | | |
| 9,926,079 B2 * | 3/2018 | Baker | ..... | B64D 11/064 |
| 10,648,494 B1 | 5/2020 | Muhammad | | |

(Continued)

FOREIGN PATENT DOCUMENTS

| | | |
|---|---|---|
| DE | 3102845 A1 | 8/1982 |
| EP | 1172251 A2 | 1/2002 |

(Continued)

OTHER PUBLICATIONS

European Patent Office, Extended European Search Report received in EP Application No. 25150544.2, Jun. 2, 2025, 9 pages.

*Primary Examiner* — Brian M O'Hara
(74) *Attorney, Agent, or Firm* — Suiter Swantz IP

(57) ABSTRACT

A seat bottom assembly including a first frame subassembly and a second frame subassembly supported by and rotatably coupled to the first frame subassembly about a rotation axis, the second frame subassembly configured to rotate about the rotation axis between a first position and a second position. A fabric diaphragm has a fore end connected to the second frame subassembly and an aft end connected to the first frame subassembly. The rotation axis is positioned forward of the connection of the aft end of the fabric diaphragm to the first frame subassembly, such that when the second frame subassembly is in the first position the fabric diaphragm is stretched, and when the second frame subassembly is in the second position the fabric diaphragm is relaxed. In use, the first position may correspond to sitting and the second position may correspond to under seat access.

17 Claims, 6 Drawing Sheets

(56) References Cited

U.S. PATENT DOCUMENTS

| | | |
|---|---|---|
| 10,669,030 B1 | 6/2020 | Morse et al. |
| 10,836,495 B2 | 11/2020 | Lozano et al. |
| 12,030,644 B2 * | 7/2024 | O'Hara ................ B64D 11/064 |
| 12,252,254 B2 * | 3/2025 | Satterfield ............ B64D 11/064 |
| 2008/0018153 A1 | 1/2008 | Forgatsch et al. |

FOREIGN PATENT DOCUMENTS

| | | |
|---|---|---|
| EP | 1177935 A2 | 2/2002 |
| ES | 2009101 A6 | 8/1989 |
| KR | 101295668 B1 | 8/2013 |
| WO | 2016193557 A1 | 12/2016 |

* cited by examiner

SEAT BOTTOM ASSEMBLY WITH SELF TENSIONING DIAPHRAGM AND UNDER SEAT ACCESS

TECHNICAL FIELD AND BACKGROUND

The present disclosure relates generally to seat assemblies including a fabric diaphragm, and more particularly, to an assembly including rotatably coupled frame subassemblies that interact to stretch or relax a fabric diaphragm depending on their relative positions.

In aircraft, passenger seats typically include a seat bottom and a seat back supported by a frame. In high-density applications, seats may be grouped together to form seating units, seating units may be arranged in rows forming columns, and columns may be positioned alongside a longitudinal aisle.

In economy seating classes, seating units may include spreaders interconnected by transverse beams, and legs for attaching the seating unit to the floor, for instance to seat tracks. In their most basic form, each of the seat bottom and the seat back may be fixed. To enhance comfort, the seat back may be adjustable between an upright sitting position for taxi, takeoff, and landing (TTOL), and a shallow recline during flight. More sophisticated seat constructions may include articulating seat components and synchronous component movements, and in some cases seats capable of achieving lie flat.

The individual support components of a seat typically include rigid frame members and an overlying cushion protected by a dress cover. In some seat constructions, rigid diaphragms may be substituted for fabric diaphragms to save weight and further enhance the seat comfort. To provide adequate support, fabric diagrams are required to be tensioned. In current seat constructions, fabric diaphragms are pre-tensioned and installed using fasteners to maintain the stretched condition. Such installation methods require the use of tools, are time consuming to perform, and are difficult to remove for access. Therefore, what is needed is a solution for imparting stretch in a fabric diaphragm that overcomes the aforementioned disadvantages.

BRIEF SUMMARY

In one aspect, embodiments of the inventive concepts disclosed herein are directed to a seat bottom assembly. In embodiments, the assembly includes a first frame subassembly, a second frame subassembly rotatably coupled to the first frame subassembly about a rotation axis, wherein the second frame subassembly is configured to rotate about the rotation axis between a first position and a second position, and a fabric diaphragm having a fore end connected to the second frame subassembly, and an aft end connected to the first frame subassembly. In embodiments, the rotation axis is positioned forward of the connection of the aft end of the fabric diaphragm to the first frame subassembly, such that when the second frame subassembly is in the first position the fabric diaphragm is stretched, and when the second frame subassembly is in the second position the fabric diaphragm is relaxed.

In some embodiments, the rotation axis is positioned above a plane of the fabric diaphragm when the second frame subassembly is in the first position.

In some embodiments, the first frame subassembly is stationary and the second frame subassembly is supported by the first frame subassembly.

In some embodiments, the first frame subassembly includes left and right frame members and fore and aft frame tubes, wherein the aft end of the fabric diaphragm is connected to the aft frame tube.

In some embodiments, the second frame subassembly includes left and right frame members and a fore frame tube, wherein the left and right frame members of the second frame subassembly are rotatably coupled to the left and right frame members of the first frame subassembly, respectively.

In some embodiments, the left and right frame members of the second frame subassembly are positioned inward of the left and right frame members of the first frame subassembly, respectively.

In some embodiments, left and right lateral sides of the fabric diaphragm are connected to the left and right frame members of the second frame subassembly, respectively.

In some embodiments, each of the fore end and the aft end of the fabric diaphragm includes a transverse sleeve configured to receive a frame member of its respective one of the first frame subassembly and the second frame subassembly to connect the fabric diaphragm to the first and second frame subassemblies.

In some embodiments, when the second frame subassembly is in the first position, the fore frame tube of the second frame subassembly is positioned forward of the fore frame tube of the first frame subassembly, and each of the left and right frame members of the second frame subassembly rests on the fore frame tube of the first frame subassembly.

In some embodiments, the first position corresponds to sitting and the second position corresponds to under seat access.

In another aspect, embodiments of the inventive concepts disclosed herein are directed to a seat bottom assembly for an aircraft passenger seat. In embodiments, the assembly includes a first frame subassembly configured to be connected to an aircraft passenger seat frame, a second frame subassembly rotatably coupled to the first frame subassembly about a rotation axis, wherein the second frame subassembly is configured to rotate about the rotation axis between a first position for sitting, and a second position providing under seat access, and a fabric diaphragm having a fore end connected to the second frame subassembly, and an aft end connected to the first frame subassembly. In embodiments, the rotation axis is positioned forward of the connection of the aft end of the fabric diaphragm to the first frame subassembly, such that when the second frame subassembly is in the first position the fabric diaphragm is stretched, and when the second frame subassembly is in the second position the fabric diaphragm is relaxed.

In yet another aspect, embodiments of the inventive concepts disclosed herein are directed to a seat bottom assembly including a first frame subassembly, a second frame subassembly rotatably coupled to the first frame subassembly about a rotation axis, and an elastomeric fabric diaphragm having a first end attached to the first frame subassembly, and a second end attached to the second frame subassembly, wherein the rotation axis is positioned relative to the first end of the elastomeric fabric diaphragm such that, when the second frame subassembly is in a first position the elastomeric fabric diaphragm is stretched, and when the second frame subassembly is in a second position the elastomeric fabric diaphragm is relaxed.

In some embodiments, the first position corresponds to a sitting position of the second frame subassembly, and the second position corresponds to an under seat access position of the second frame subassembly.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
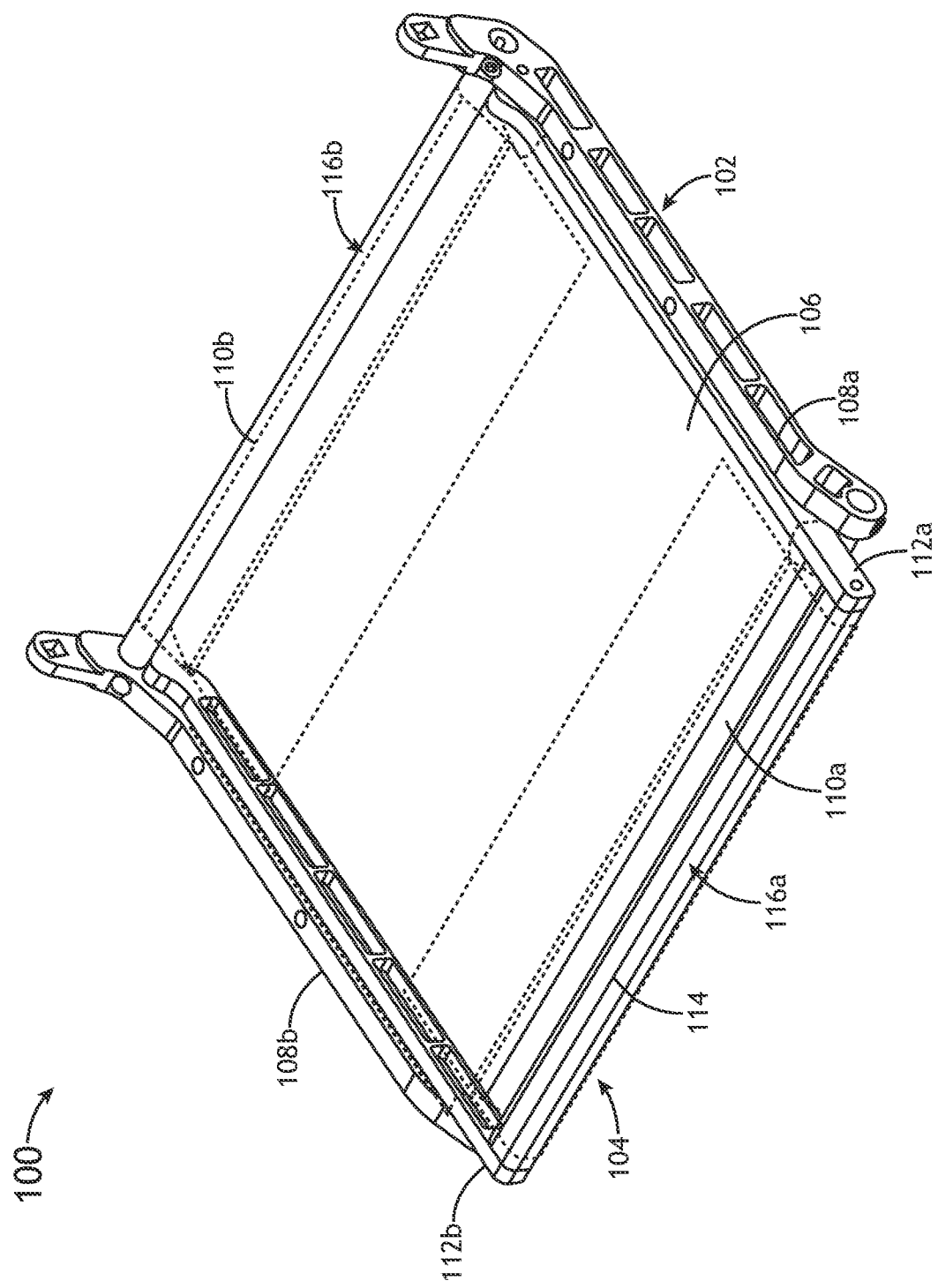
FIG. 1 is an isometric view of a seat bottom assembly, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a seat bottom assembly for a passenger seat such as an aircraft passenger seat, and in some applications an economy class aircraft passenger seat. The seat bottom assembly includes an elastomeric fabric diaphragm configured to flex under load to provide increased comfort. The seat bottom assembly is dual function in that, when in a first operating condition the seat bottom assembly can be used for sitting, and when in a second operating condition the seat bottom assembly can be used to provide under seat access. The configuration of the seat bottom assembly is such that, when configured for sitting, the fabric diaphragm is stretched, and when configured to provide under seat access, the fabric diaphragm is relaxed. The configuration of the interacting frame subassemblies is such that the fabric diaphragm is automatically stretched when moved (e.g., rotated or pivoted) toward the siting position, and automatically relaxed when moved (e.g., rotated or pivoted) to the under seat access position.

In embodiments, the fabric diaphragm is elastomeric and is stretched between two tubes of different frame subassemblies that are rotatably coupled. The rotation axis, about which one of the frame subassemblies rotates relative to the other, is positioned 'inward' of one of the attachments of the fabric diaphragm, such that a distance between the two tubes when the assembly is configured for under seat access is shorter than a distance between the two tubes when the assembly is configured for sitting. In addition, the rotation axis is positioned above a plane of the fabric diaphragm when the assembly is configured for sitting. In use, the positional relationship of the rotation axis to the aft attachment of the fabric diaphragm can be customized to impart a predefined tension in the fabric diaphragm based comfort, fabric diaphragm material performance, etc.

FIG. 1 illustrates a seat bottom assembly 100 according to the present disclosure. The seat bottom assembly 100 generally includes a first frame subassembly 102, a second frame subassembly 104 rotatably coupled to the first frame subassembly 102, and a fabric diaphragm 106 connected to each of the first and second frame subassemblies 102, 104. In embodiments, the fabric diaphragm 106, which is shown as being transparent for clarity, may be elastomeric in order to stretch and relax depending on the configuration of the seat bottom assembly 100 as discussed below.

In embodiments, the seat bottom assembly 100 is configured to be attached to, or integrated into the construction of, a frame of a passenger seat (not shown). In a non-limiting example, the passenger seat may be an aircraft passenger seat, for instance an economy or coach class passenger seat. In a particular implementation, the seat bottom assembly 100 may be attached to transverse beams in a seating unit construction, and is compatible for use with a variety of different seat back configurations that may be fixed or recline capable.

The first frame subassembly 102, which may be fixed in position, generally includes left and right frame members 108a, 108b, and fore and aft frame tubes 110a, 110b. As used herein, the term 'fore' refers to the front or forward end of the seat, and likewise the term 'aft' refers to the rear or back end of the seat. The left and right frame members 108a, 108b, also referred to as the first and second frame members, are spaced apart and parallel, and are interconnected at their opposing ends by the fore and aft frame tubes 110a, 110b arranged transverse. The components of the first frame subassembly 102 are connected to form a 'picture frame' forming an interior space for under seat access as discussed below.

In embodiments, the left and right frame members 108a, 108b may be spreader-like and include attachments for connecting a seat back. The fore and aft frame tubes 110a, 110b may be cylindrical and hollow as shown, or may be solid and have a different geometry. As shown, the end of the fore and aft frame tubes 110a, 110b are received within openings formed in the left and right frame members 108a, 108b. In some embodiments, the fore and aft frame tubes 110a, 110b may be further elongated and part of a seating unit including at least one additional seat positioned side by side.

The second frame subassembly 104, which is rotatably coupled to the first frame assembly 102, generally includes left and right frame members 112a, 112b, and a fore frame tubes 114. The left and right frame members 112a, 112b, also referred to as the first and second frame members, are spaced apart and parallel, and are interconnected at their fore end by the fore frame tube 114 arranged transverse. The left and right frame members 112a, 112b of the second frame subassembly 104 are positioned inward of the left and right frame members 108a, 108b of the first frame subassembly 102, respectively. As such, the second frame subassembly 104 is positioned, at least partly, in the interior space formed by the first frame subassembly 102.

The longitudinal alignment of the first and second frame subassemblies 102, 104 is such that the fore frame tube 114 of the second frame subassembly 104 extends forward beyond the fore frame tube 110a of the first frame subassembly. In this configuration, when in the first position for sitting, the left and right frame members 112a, 112b of the second frame subassembly 104 rest on the fore frame tube 110a of the first frame subassembly 102 to support the second frame subassembly 104 and prevent further downward rotation. The aft ends of the left and right frame members 112a, 112b of the second frame subassembly are separately rotatably coupled to the left and right frame members 108a, 108b of the first frame subassembly 102, respectively. In embodiments, the components may be connected to form orthogonal angles between connected components for squareness.

The fabric diaphragm 106 has fore and aft ends 116a, 116b associated with the frame subassemblies, and left and right lateral sides 118a, 118b associated with the left and right frame members of the second frame subassembly 104. More specifically, the fore end 116a of the fabric diaphragm 106 is connected to the fore frame tube 114 of the second frame subassembly 104, and the aft end 116b of the fabric diaphragm 106 is connected to the aft frame tube of the first frame subassembly 102. With the configuration of the frame subassemblies 102, 104, and the fabric diaphragm 106 as described, the forward end of the second frame subassembly 104 is capable of rotating up or down to achieve the first and second positions described below. In embodiments, each of the fore and aft ends 116a, 116b of the fabric diaphragm 106 may include a transverse sleeve configured to receive its respective frame tube.

Figure 2:
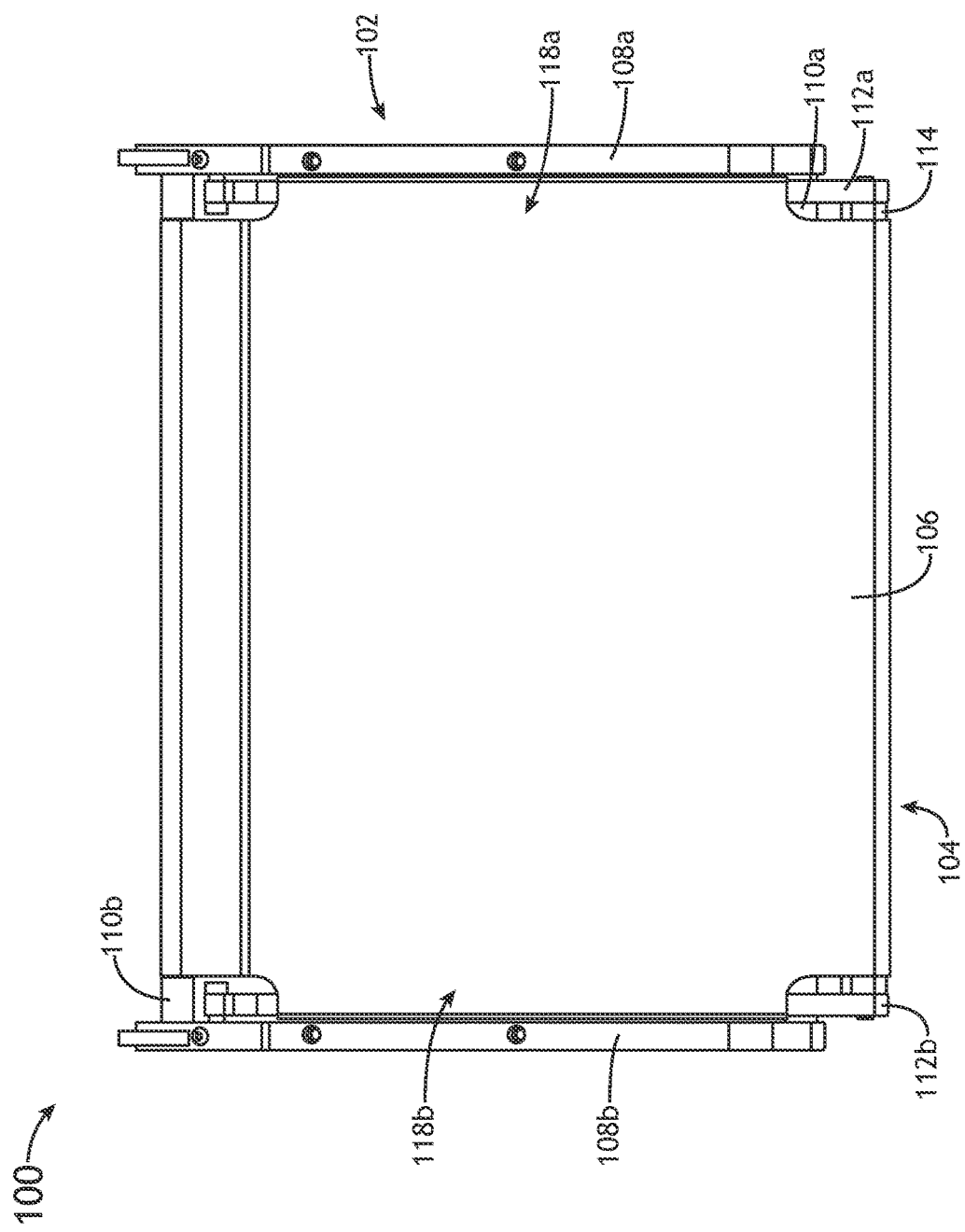
FIG. 2 is a top plan view of the seat bottom assembly including a second frame assembly shown in a position for sitting, in accordance with example embodiments of this disclosure.

FIG. 2 illustrates the seat bottom assembly 100 from above to show the positional relationship between the first and second frame subassemblies 102, 104, and with respect to the fabric diaphragm 106. The left and right lateral sides 118a, 118b of the fabric diaphragm 106 may or may not be attached to the left and right frame members 112a, 112b of the second frame subassembly 104. For example, the left and right lateral sides 118a, 118b may be detached, may overlap, or may receive the left and right frame members 112a, 112b, respectively.

FIGS. 1 and 2 further illustrate a first position of the second frame assembly 104 which corresponds to a sitting position for use as a seat. In the first position, the first and second frame subassemblies 102, 104 are substantially coplanar, and as stated above, the second frame subassembly 104 rests on the first frame subassembly 102.

Figure 3:
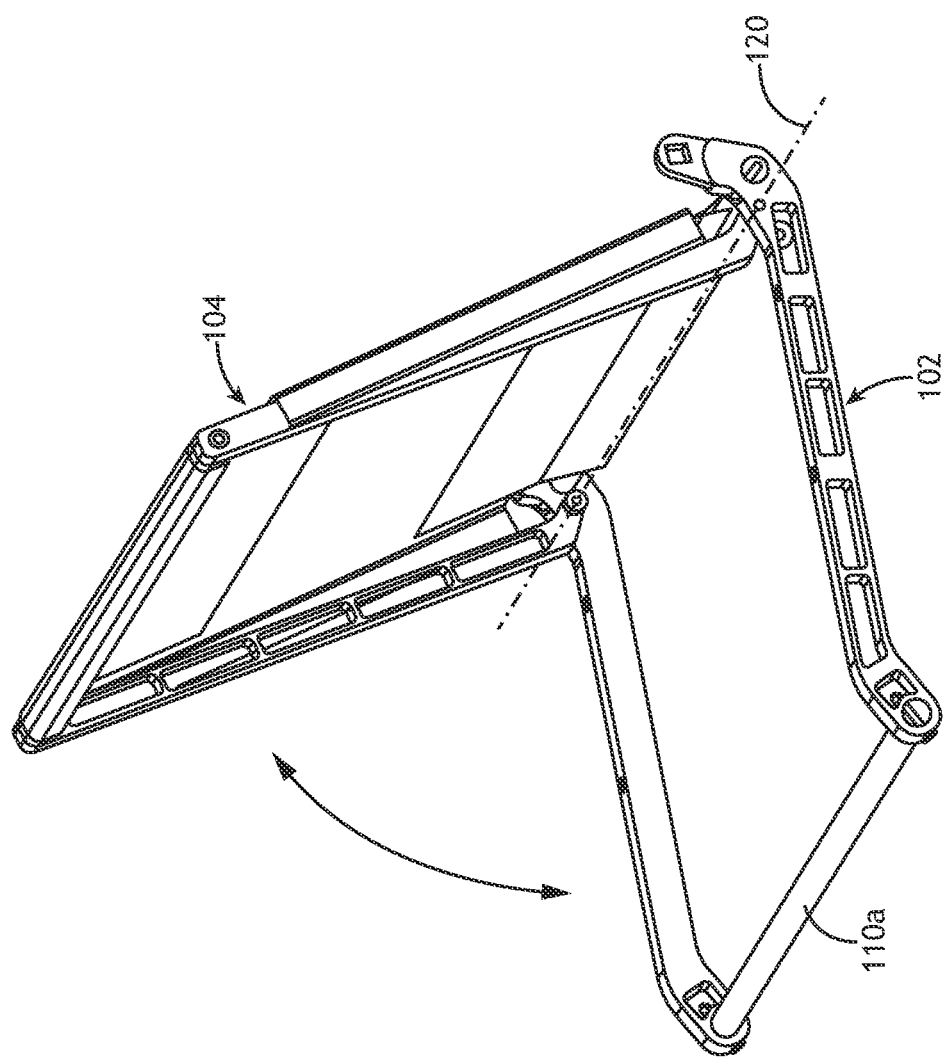
FIG. 3 is a front isometric view showing the seat bottom assembly wherein the second frame subassembly is rotated to a position for under seat access, in accordance with example embodiments of this disclosure.
Figure 4:
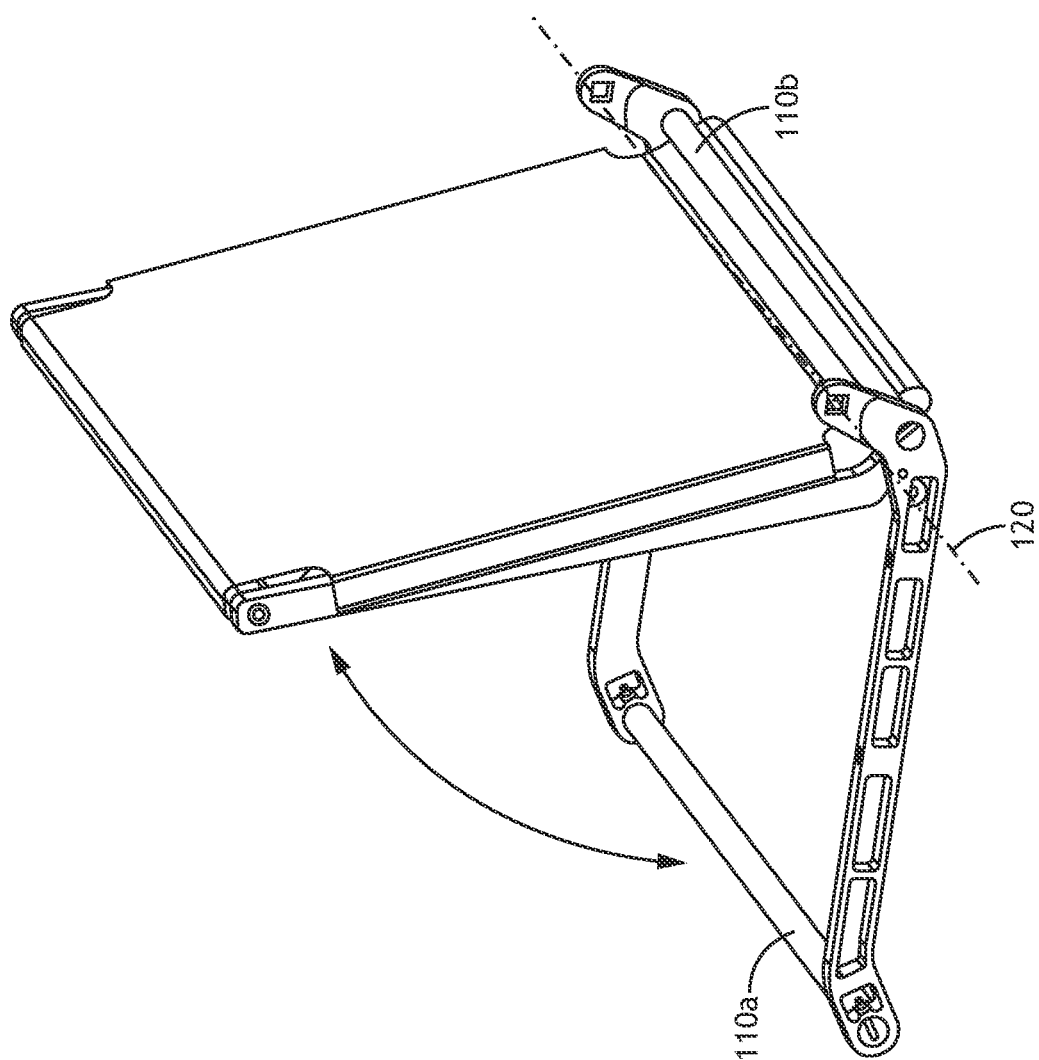
FIG. 4 is a rear isometric view showing the seat bottom assembly wherein the second frame subassembly is rotated to a position for under seat access, in accordance with example embodiments of this disclosure.

FIGS. 3 and 4 illustrate a second position of the second frame subassembly 104 which corresponds to a configuration that provides under seat access. More specifically, when the second frame subassembly 104 is rotated upward, the interior space formed by the first frame subassembly 102 becomes accessible, for example, to accessing the under seat frame and components positioned under the seat, for servicing the seat, etc. In embodiments, the second frame subassembly 104 may be manipulated 'up' and 'down' manually.

The first and second frame subassemblies 102, 104 are rotatably coupled about a rotation axis 120. In other words, the second frame subassembly 104 is configured to rotate around the rotation axis 120 to change the position of the second frame subassembly 104 relative to the first frame subassembly 102. More specifically, rotate or pivot the second frame subassembly 104 between the first and second positions. When in the second position, because of the positional relationship of the rotation axis 120 relative to the connection of the aft end 116b of the fabric diaphragm 106 with the aft frame tube 110b, the fabric diaphragm 106 is stretched when the second frame subassembly 104 is in the first position for sitting, and is relaxed when the second frame subassembly 104 is in the second position for under seat access. In other words, tension, in the longitudinal direction of the fabric diaphragm 106, changes as the second frame subassembly 104 is rotated between the first and second positions.

Figure 5:
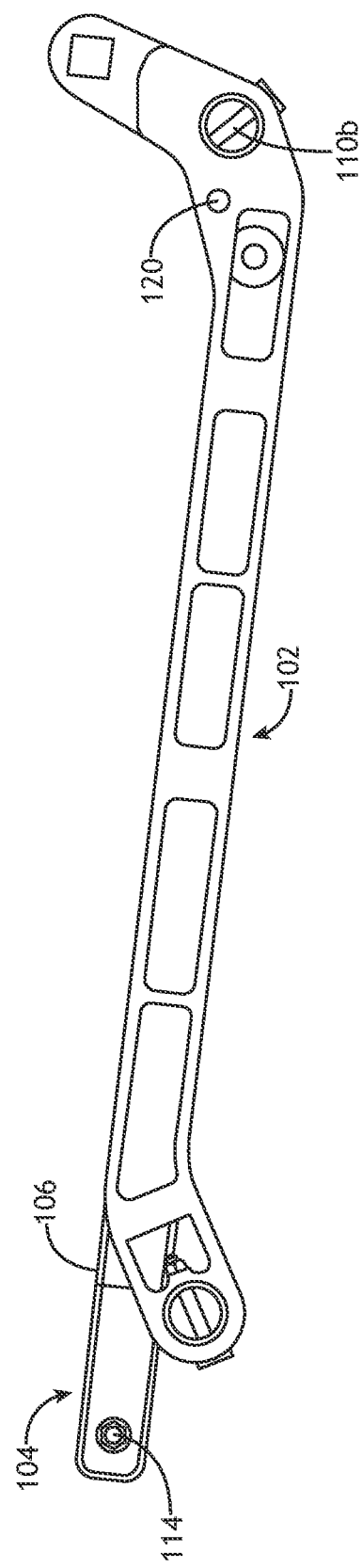
FIG. 5 is a side elevation view of the seat bottom assembly showing the second frame subassembly in a position for sitting.
Figure 6:
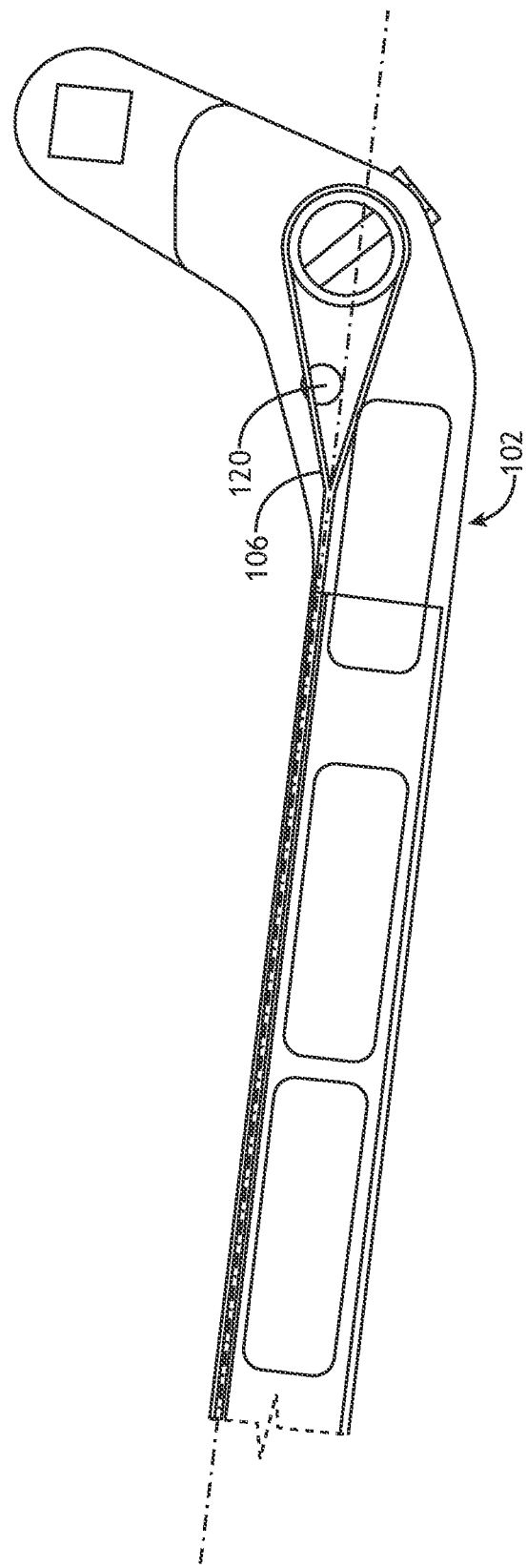
FIG. 6 is a fragmentary side view showing a positional relationship between a plane of the fabric diaphragm in the second position, and the rotation axis of the second frame subassembly, in accordance with example embodiments of this disclosure.

Referring to FIGS. 5 and 6, the rotation axis 120 is positioned inward (i.e., in a direction of the forward end of the seat) relative to the connection of the aft end of the fabric diaphragm 106 to the aft frame tube 110b of the first frame subassembly 102. At the same time, the rotation axis 120 is positioned above a plane of the fabric diaphragm 106 when the second frame subassembly 104 is in the first position. In this configuration, the distance between the two frame tubes (i.e., the fore frame tube 114 of the second frame subassembly 104 and the aft frame tube 110b of the first frame subassembly 102) when the second frame subassembly 104 is in the second position is shorter than the distance between the same two frame tubes (i.e., 114, 110b) when the second frame subassembly 104 is in the first position. As such, the shorter distance between the interconnected frame tubes when in the second position causes the fabric diaphragm 106 to relax, and the longer distance of the same frame tubes when in the first position causes the fabric diaphragm 106 to stretch, in the longitudinal direction. The positional relationships can be adjusted to control the amount of stretch, as well as the material selection of the fabric diaphragm 106. Therefore, by connecting the fabric diaphragm 106 at opposing ends to the each of the coupled frame subassemblies 102, 104, the relative motion between the two assemblies can be adjusted to customize the tension in the fabric diaphragm 106.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A seat bottom assembly, comprising:
   a first frame subassembly;
   a second frame subassembly rotatably coupled to the first frame subassembly about a rotation axis, wherein the second frame subassembly is configured to rotate about the rotation axis between a first position in which the first and second frame subassemblies are substantially coplanar, and a second position in which the second frame subassembly is rotated upward; and
   a fabric diaphragm having a fore end connected to the second frame subassembly, and an aft end connected to the first frame subassembly;
   wherein the rotation axis is positioned forward of the connection of the aft end of the fabric diaphragm to the first frame subassembly, such that when the second frame subassembly is in the first position the fabric diaphragm is stretched, and when the second frame subassembly is in the second position the fabric diaphragm is relaxed.

2. The seat bottom assembly according to claim 1, wherein the rotation axis is positioned above a plane of the fabric diaphragm when the second frame subassembly is in the first position.

3. The seat bottom assembly according to claim 1, wherein the first frame subassembly is stationary.

4. The seat bottom assembly according to claim 1, wherein the first frame subassembly comprises:
   left and right frame members; and
   fore and aft frame tubes;
   wherein the aft end of the fabric diaphragm is connected to the aft frame tube.

5. The seat bottom assembly according to claim 4, wherein the second frame subassembly comprises:
   left and right frame members; and
   a fore frame tube;
   wherein the fore end of the fabric diaphragm is connected to the fore frame tube of the second frame subassembly; and
   wherein the left and right frame members of the second frame subassembly are rotatably coupled to the left and right frame members of the first frame subassembly, respectively.

6. The seat bottom assembly according to claim 5, wherein the left and right frame members of the second frame subassembly are positioned inward of the left and right frame members of the first frame subassembly, respectively.

7. The seat bottom assembly according to claim 5, wherein left and right lateral sides of the fabric diaphragm are connected to the left and right frame members of the second frame subassembly, respectively.

8. The seat bottom assembly according to claim 1, wherein each of the fore end and the aft end of the fabric diaphragm includes a transverse sleeve configured to receive a frame member of its respective one of the first frame subassembly and the second frame subassembly to connect the fabric diaphragm to the first and second frame subassemblies.

9. The seat bottom assembly according to claim 1, wherein, when the second frame subassembly is in the first position:
   the fore frame tube of the second frame subassembly is positioned forward of the fore frame tube of the first frame subassembly; and
   each of the left and right frame members of the second frame subassembly rests on the fore frame tube of the first frame subassembly.

10. The seat bottom assembly according to claim 1, wherein:
    the first position corresponds to sitting; and
    the second position corresponds to under seat access.

11. A seat bottom assembly for an aircraft passenger seat, comprising:
    a first frame subassembly configured to be connected to an aircraft passenger seat frame;
    a second frame subassembly rotatably coupled to the first frame subassembly about a rotation axis, wherein the second frame subassembly is configured to rotate about the rotation axis between a first position in which the first and second frame subassemblies are substantially coplanar for sitting, and a second position in which the second frame subassembly is rotated upward for under seat access; and
    a fabric diaphragm having a fore end connected to the second frame subassembly, and an aft end connected to the first frame subassembly;
    wherein the rotation axis is positioned forward of the connection of the aft end of the fabric diaphragm to the first frame subassembly, such that when the second frame subassembly is in the first position the fabric diaphragm is stretched, and when the second frame subassembly is in the second position the fabric diaphragm is relaxed.

12. The seat bottom assembly according to claim 11, wherein the rotation axis is positioned above a plane of the fabric diaphragm when the second frame subassembly is in the first position.

13. The seat bottom assembly according to claim 11, wherein:
the first frame subassembly comprises:
left and right frame members; and
fore and aft frame tubes;
wherein the aft end of the fabric diaphragm is connected to the aft frame tube; and
the second frame subassembly comprises:
left and right frame members; and
a fore frame tube;
wherein the fore end of the fabric diaphragm is connected to the fore frame tube of the second frame subassembly; and
wherein the left and right frame members of the second frame subassembly are rotatably coupled to the left and right frame members of the first frame subassembly, respectively.

14. The seat bottom assembly according to claim 13, wherein the left and right frame members of the second frame subassembly are positioned inward of the left and right frame members of the first frame subassembly, respectively.

15. The seat bottom assembly according to claim 13, wherein left and right lateral sides of the fabric diaphragm are connected to the left and right frame members of the second frame subassembly, respectively.

16. The seat bottom assembly according to claim 13, wherein:
each of the fore end and the aft end of the fabric diaphragm includes a transverse sleeve;
the transverse sleeve of the fore end of the fabric diaphragm is configured to receive the fore frame tube of the second frame subassembly; and
the transverse sleeve of the aft end of the fabric diaphragm is configured to receive the aft frame tube of the first frame subassembly.

17. The seat bottom assembly according to claim 11, wherein, when the second frame subassembly is in the first position:
the fore frame tube of the second frame subassembly is positioned forward of the fore frame tube of the first frame subassembly; and
each of the left and right frame members of the second frame subassembly rests on the fore frame tube of the first frame subassembly.

* * * * *